(12) United States Patent
Kafka et al.

(10) Patent No.: US 7,003,011 B2
(45) Date of Patent: Feb. 21, 2006

(54) THIN DISK LASER WITH LARGE NUMERICAL APERTURE PUMPING

(75) Inventors: James D. Kafka, Palo Alto, CA (US); Dirk Sutter, Mountain View, CA (US)

(73) Assignee: Spectra Physics, Inc., Mountain View, CA (US)

( * ) Notice: Subject to any disclaimer, the term of this patent is extended or adjusted under 35 U.S.C. 154(b) by 119 days.

(21) Appl. No.: 10/233,140

(22) Filed: Aug. 30, 2002

(65) Prior Publication Data

US 2004/0042524 A1    Mar. 4, 2004

(51) Int. Cl.
*H01S 3/09*    (2006.01)

(52) U.S. Cl. .......................... 372/69; 372/34; 372/36; 372/75

(58) Field of Classification Search ................. 372/36, 372/34, 67, 75, 69, 35
See application file for complete search history.

(56) References Cited

U.S. PATENT DOCUMENTS

| | | | | |
|---|---|---|---|---|
| 3,960,571 A | * | 6/1976 | Okumura et al. ............ 430/554 |
| 5,200,947 A | * | 4/1993 | Satake et al. ............. 369/275.1 |
| 5,553,088 A | * | 9/1996 | Brauch et al. ................. 372/34 |
| 5,790,574 A | | 8/1998 | Rieger et al. .................. 372/13 |
| 5,825,551 A | | 10/1998 | Clarkson et al. ............ 359/629 |
| 5,999,544 A | | 12/1999 | Petersen ......................... 372/6 |
| 5,999,554 A | | 12/1999 | Marshall ....................... 372/71 |
| 6,304,584 B1 | | 10/2001 | Krupke et al. ................ 372/22 |
| 6,347,109 B1 | * | 2/2002 | Beach et al. .................. 372/75 |
| 6,358,387 B1 | * | 3/2002 | Kopf-Sill et al. ........... 204/603 |
| 2001/0055422 A1 | * | 12/2001 | Roustaei ..................... 382/181 |
| 2003/0161376 A1 | * | 8/2003 | Zapata ........................ 372/70 |
| 2004/0046221 A1 | * | 3/2004 | Kuzma ........................ 257/423 |
| 2004/0055525 A1 | * | 3/2004 | Diaz et al. ..................... 117/2 |

OTHER PUBLICATIONS

Erhard, et al., "Pumping schemes for multi-kW thin disk lasers", Proceedings of Advanced Solid State Lasers Conference 2000, OSA Trends in Optics and Photonics Series, vol. 34, p. 78-84.

Giesen, et al., "Multiwatt diode-pumped Yb:YAG thin disk laser continuously tunable between 1018 and 1053 nm", Optics Letters, vol. 20, No. 7, pp. 713-715, Apr. 1, 1995.

Klopp, et al., "Laser operation of the new stoichiometric crystal $KYb(WO_4)_2$", Applied Physics B 74, pp. 185-189 (2002).

Patel, et al., "Laser Demonstration of $Yb_3Al_5O_{12}$ (YbAG) and Materials Properties of Highly Doped Yb:YAG", IEEE Journal of Quantum Electronics, vol. 37 , No. 1, Jan. 2001.

* cited by examiner

*Primary Examiner*—Minsun Oh Harvey
*Assistant Examiner*—Dung Nguyen
(74) *Attorney, Agent, or Firm*—Paul Davis; Heller Ehrman LLP

(57) ABSTRACT

An optical system has a high power diode pump source and a thin disk gain media. An optical coupler is positioned between the diode pump source and the thin disk gain media. The optical coupler produces a beam with a large numerical aperture incident on the thin disk gain media.

53 Claims, 5 Drawing Sheets

(a)

(b)

(a)

(b)

THIN DISK LASER WITH LARGE NUMERICAL APERTURE PUMPING

CROSS-REFERENCE TO RELATED APPLICATIONS

This application is related to U.S. patent application Ser. No. 10/233,138, and U.S. patent application Ser. No. 10/232,885, both of which are filed concurrently herewith.

BACKGROUND OF THE INVENTION

1. Field of the Invention

This invention relates to a thin disk gain media for lasers and amplifiers, and more particularly to an optical system for pumping the gain media with a large numerical aperture beam.

2. Description of Related Art

As diode lasers and diode laser arrays have become more powerful, higher power diode-pumped solid-state lasers have become possible. Many schemes have been proposed to efficiently couple the pump light from multiple high power diode bars or diode bar arrays into the solid-state gain medium. It is desirable to build a high power laser that also possesses a good mode quality, and this is a challenge as the power of the laser increases. One scheme that achieves both high power and good mode quality is the thin disk laser configuration described in U.S. Pat. No. 5,553,088 by Brauch, Giesen, Voss and Wittig and in Optics Letters volume 20, page 713 (1995).

In the thin disk configuration, the gain medium is typically a disk of a few millimeters in diameter and only a few hundred microns thick. It is attached to a heat sink on the cooling surface. That same cooling surface is coated to reflect both the pump light and the laser light. Thus the thin disk laser is an end-pumped design with the pump light and the laser light being collinear. If the pump mode and the laser mode are matched in size, then the mode quality can be quite good without any loss in efficiency. This is typical of end-pumped designs and is in contrast to side-pumped configurations. If the disk is thin enough, the cooling will be 1-dimensional and the thermal gradient will also be collinear with the laser beam. Thus, the thermal lensing across the beam will be quite small. This is in contrast to most other end-pumped designs where the thermal lensing is significant and must be partially compensated by the design of the laser cavity.

The thin disk design does have added complexity however, because the pump light must be passed through the gain medium multiple times. The paper "pumping schemes for multi-kW thin disk lasers" by Erhard, Karszewski, Stewen, Giesen, Contag and Voss in Proceedings of Advanced Solid State Lasers conference 2000, OSA Trends in Optics and Photonics Series, Volume 34, page 78 teaches that: "for quasi-three-level systems like Yb:YAG also the reabsorption of the laser wavelength in the laser active medium plays an important role. Increasing the pump absorption in an end-pumped configuration by increasing the length of the laser active medium also increases the reabsorption losses for the laser wavelength.

Therefore the total efficiency is limited in such a configuration. The way to higher efficiency is the reduction of the reabsorption losses by reducing the length of the crystal and/or by reducing the doping concentration while simultaneously keeping the absorption of the pump radiation high. In an end-pumped configuration this can be achieved only by multiple passing of the pump radiation through the medium as it is demonstrated in the thin disk design." The authors continue by showing that increasing the number of passes the pump light makes through the medium leads to higher efficiency when thinner crystals are used.

There are secondary reasons for the multiple passes of the pump light. The disks must be kept thin in order to preserve the 1-dimensional cooling. In addition, the fracture limit scales as the inverse of the thickness of the disk. Unfortunately the maximum doping level, and thus the maximum absorption, for most gain medium is limited. One of the gain media with the strongest absorption is $Nd:YVO_4$ (Vanadate). Vanadate is a 4 level laser and thus complete absorption of the pump is optimal. Using Vanadate with a doping of 1 at. %, four passes of the pump radiation and a 400 micron thick disk are required to absorb 86% of the pump radiation. Higher Nd doping levels in Vanadate are possible, but lead to a reduced lifetime and reduced efficiency.

Recent work has focused on designs for achieving a large number of passes for the pump light. In designs utilizing 16 passes of the pump light, the light from the diode bars is typically fiber coupled into a fiber bundle with a numerical aperture (NA) of 0.1. This pump light is imaged by a mirror onto the disk. The remaining pump light is collected by another mirror and imaged back to the disk. A series of 8 mirrors is then used to create the 16 passes of the pump light through the gain media. Each of the mirrors needs to be large enough to capture the pump beam with a numerical aperture of 0.1.

In an alternative design, a large parabolic mirror is used and 8 different segments of this mirror replace the 8 separate mirrors of the previous design. Each segment of the parabolic mirror must now have an NA of 0.1. This requires either a brighter pump source (NA<0.1) or a larger high NA parabolic mirror. A brighter pump source can produce the same spot size with a lower NA or alternatively a smaller spot size with a constant NA.

Recently two stoichiometric materials that incorporate Yb in the crystal matrix have been demonstrated. The first, YbAG, is the host crystal YAG with all of the Yttrium replaced by Ytterbium. This crystal is thus Yb:YAG with 100% Yb doping. It is described in "Laser demonstration of YbAG and Materials properties of highly doped Yb:YAG" by Patel, Honea, Speth, Payne, Hutcheson and Equall in IEEE Journal of Quantum Electronics, vol. 37, page 135 (2001). In YbAG it has been demonstrated that 100% doping of the YAG with Yb can still lead to a good laser crystal without significant degradation in the lifetime. Most importantly, all of the pump light can be absorbed in a disk of less than 300 microns with just a single pass.

A second stoichiometric crystal called KYbW is based on the host KYW with all of the Yttrium again replaced by Ytterbium. It is described in "Laser operation of the new stoichiometric crystal $KYb(WO_4)_2$", by Klopp et al., in Applied Physics B, vol. 74, page 185 (2002). The calculated absorption length in KYbW is less than 20 microns.

These highly doped stoichiometric materials present several new possibilities. One is to continue to use multiple passes of the pump light and thinner disks. This will improve the cooling. The other possibility is to design simpler and less expensive systems. Higher NA pump schemes have not previously been contemplated for thin disk systems because of the challenges of using high NA mirrors with multiple pass pumping. High NA pump schemes have several advantages, however, especially with respect to reducing complexity and cost.

A first advantage of higher NA pump schemes is that less bright pump sources can be used. Higher NA pump schemes make sense with thin disk gain media, because the pump beam does not diverge within the gain media. These less bright pump sources can include diode stacks and diode arrays with fewer beam shaping optics. Typical beam shaping optics include fast axis collimating lenses on each diode bar, beam shapers that transform the beam quality in the horizontal and vertical directions to symmetrize the pump beam, and polarizing optics that allow two diode stacks of opposite polarization to be combined. Each of these beam shaping optics help preserve the brightness of the pump source, but increase the cost and complexity of the pump source.

Second, non-imaging concentrators can be used in place of imaging systems. Lens ducts or hollow funnel concentrators can be utilized. These non-imaging concentrators convert a large beam with a low NA from a diode stack into a smaller beam with a larger NA. This allows a large diode stack, typically 1 cm square, with space between the diode bars for efficient cooling, to be used. The concentrator can reduce the beam size by a factor of 4 or 5 but the NA of the beam will increase by the same factor. A hollow funnel is the preferred embodiment when relaying the pump beam to the gain media with a minimum cost is required.

Third, multiple pump sources can be incident on the thin disk gain media from different angles. Thus individual diode bars can be aimed at the pump spot on the gain media from multiple directions. Removing the heat from these separate bars is then made easier. Multiple diode stacks displaced around the disk can be used as well to increase the power. Each diode stack has its own coupler and would deliver the pump beam to the disk from a different direction.

There is a need for an improved optical system, and its methods of use, that has a thin disk gain media. There is a further need for an optical system, and its methods of use, that has a diode-pumped thin disk gain media and utilizes a high NA pumping scheme to reduce the cost and complexity.

SUMMARY OF THE INVENTION

Accordingly, an object of the present invention is to provide a diode-pumped laser, and its methods of use, with high power and a good mode.

A further object of the present invention is to provide a diode-pumped laser, and its methods of use, with high power and a good mode, that is simpler and less expensive.

Accordingly, these and other objects of the present invention are achieved in an optical system that has a high power diode pump source and a thin disk gain media. An optical coupler is positioned between the diode pump source and the thin disk gain media. The optical coupler produces a beam with a large numerical aperture incident on the thin disk gain media.

In another embodiment of the present invention, an optical system is provided that has at least first and second high power diode pump sources which produce first and second pump beams. A thin disk gain media is provided. An optical coupler is positioned between each of the diode pump sources and the thin disk gain media. The first and second pump beams are incident on the thin disk gain media from different directions.

In another embodiment of the present invention, a method of pumping a thin disk gain media produces a high power diode pump beam from a pump source. The high power diode pump beam is passed through an optical coupler positioned between the diode pump source and a thin disk gain media. A high numerical aperture output beam is produced from the optical coupler. The high numerical aperture output beam is incident at an incidence surface of the thin disk gain media.

In another embodiment of the present invention, a method is provided for materials processing, including but not limited to micro-machining, rapid prototyping, annealing, ablation, initiating chemical processes, medical applications and the like, that produces a high power diode pump beam from a pump source. The high power diode pump beam is passed through an optical coupler positioned between the diode pump source and a thin disk gain media. A high numerical aperture output beam is created from the optical coupler. The high numerical aperture output beam is incident at the incidence surface of the thin disk gain media to produce an output beam. The output beam is directed to an article to be processed.

In another embodiment of the present invention, a method of pumping a thin disk gain media is provided. First and second pump beams are produced from first and second pump sources. The first and second pump beams are each passed through an optical coupler positioned between the diode pump source and a thin disk gain media to produce first and second gain media beams. The first and second gain media beams are incident on the thin disk gain media from different directions.

DETAILED DESCRIPTION OF THE PREFERRED EMBODIMENTS

Figure 1:
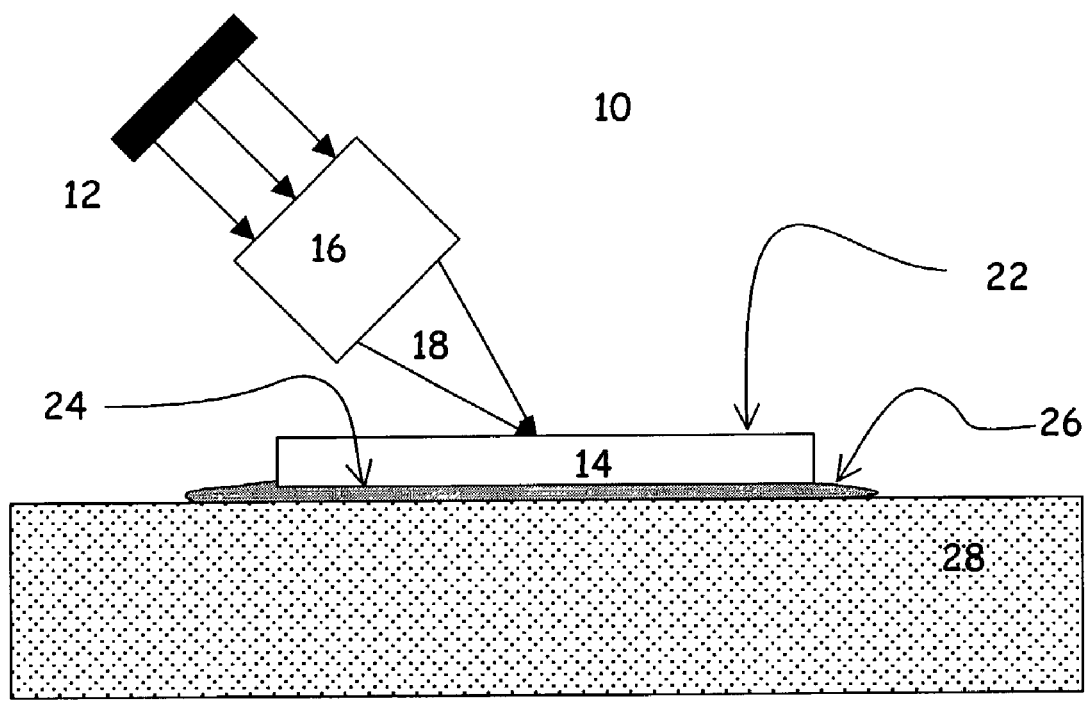
FIG. 1 is a schematic diagram illustrating one embodiment of an optical system of the present invention that includes a diode pump source, a coupler, a thin disk gain media and a heat sink.

Referring to FIG. 1, one embodiment of the present invention is an optical system 10 with a high power diode pump source 12 and a thin disk gain media 14. One example of a thin disk gain media is disclosed in U.S. Pat. No. 5,553,088, incorporated herein by reference. An optical coupler 16 is positioned between the diode pump source 12 and the thin disk gain media 14. Suitable distances between diode pump source 12 and thin disk gain media 14 are in the range of 10 to 200 cm, not including the length of an associated fiber, if any. Optical coupler 16 produces a beam 18 that has a large numerical aperture incident on thin disk gain media 14.

Pump source 12 can be one or more diode bars, a linear array of diode bars or, preferably a vertical stack of diode bars and can have a power of at least 50 W, and more preferably at least 200 W.

In various embodiments, the numerical aperture of beam 18 incident on thin disk gain media 14 is greater than 0.35, greater than 0.4, greater than 0.5 and the like.

Optical coupler 16 can be a non-imaging concentrator including but not limited to a lens duct, a hollow funnel concentrator, and the like. One example of a suitable funnel concentrator is disclosed in U.S. Ser. No. 09/401,146, filed Sep. 22, 1999, incorporated herein by reference. Further, optical coupler 16 can be a cylindrical lens to collimate a fast axis divergence of the pump source 12, a combination of several cylindrical lenses, and the like. Optical coupler 16 may also contain a beam shaper, a polarization beam combiner, a wavelength beam combiner, a beam homogenizer and the like. The beam shaper transforms the quality of beam 18 in the horizontal and vertical directions in order to symmetrize the beam 18. The beam shaper can be made from an array of micro-mirrors, a stack of plates or a pair of mirrors as disclosed in U.S. Pat. No. 5,825,551, incorporated herein by reference. In one embodiment, optical coupler 16 converts a large beam that has a low numerical aperture which can be 0.1 from the diode pump source 12 into a smaller beam with a larger numerical aperture which can be 0.2 to 0.5.

Further, optical coupler 16 can be selected that reduces a beam size from the diode pump source 12 by a factor of at least two and more preferably 3 or 4. The numerical aperture of the beam from the diode pump source 12 then increases by a factor of at least two and more preferably 3 or 4.

Thin disk gain media 14 can be in a variety of different shapes including but not limited to a thin round plate or a thin square plate. Thin disk gain media 14 has an incidence surface 22 and a cooling surface 24. Incidence surface 22 is the surface through which beam 18 is incident on, and cooling surface 24 is the surface through which the heat is removed. Incidence surface 22 and cooling surface 24 are typically the opposite sides of the thin disk gain media 14, but they can be the same surface if a transparent heat sink material such as undoped YAG is used. Thin disk gain media 14 can have dimensions where the thickness is much smaller than the aperture. Examples of suitable sizes include but are not limited to a aperture of 2 to 50 mm, and a thickness of 10 to 500 microns.

Bonding material 26, including but not limited to a soldering material, a glue and the like, couples cooling device 28 to cooling surface 24. Suitable cooling devices 28 include but are not limited to a heat sink made of metal, beryllium oxide, undoped YAG, ceramic materials and the like.

Thin disk gain media 14 can be made of a variety of different materials including but not limited to Yb:YAG, Yb:KGW, Yb:KYW, Yb:S-FAP, Nd:YAG, Nd:KGW, Nd:KYW, or Nd:YVO$_4$. Thin disk gain media 14 can also be made of a semiconductor material. To obtain a high absorption in thin disk gain media 14, a stoichiometric gain material such as those described herein can be utilized. By way of example, and without limitation, the stoichiometric gain material can be a stoichiometric Yb$^{3+}$ material, such as YbAG, KYbW and the like.

Figure 2:
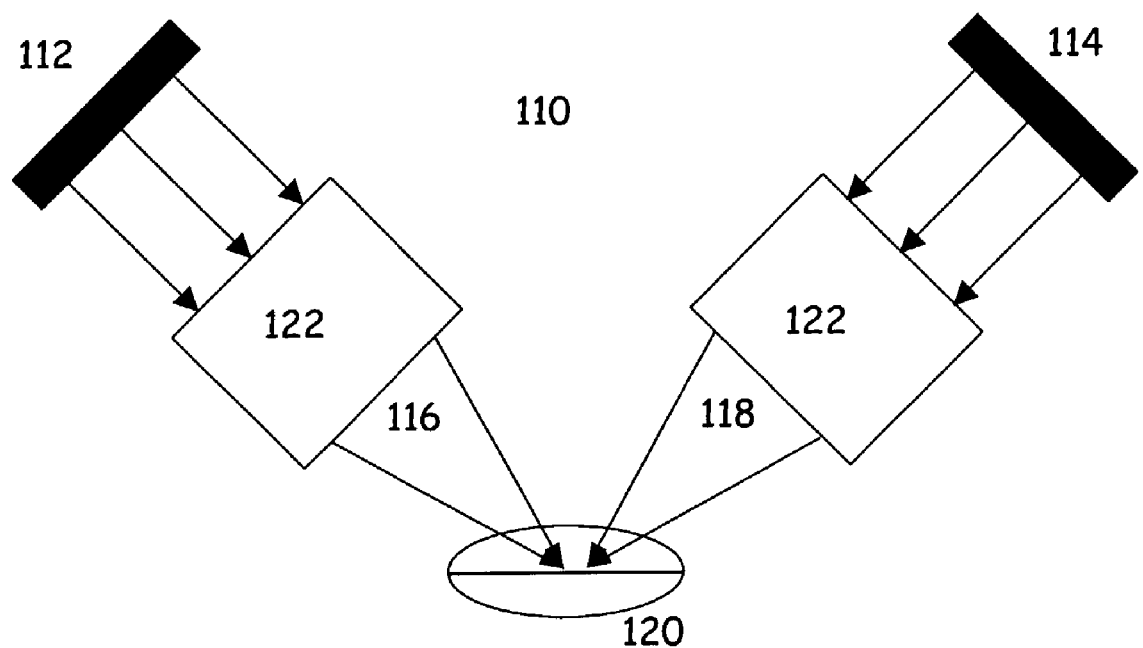
FIG. 2 is a schematic diagram illustrating an embodiment of an optical system of the present invention that includes two diode pump sources, each with a coupler and the thin disk gain media.

Referring now to FIG. 2, one embodiment of the present invention is an optical system 110 with at least first and second high power diode pump sources 112 and 114 which produce first and second pump beams 116 and 118. A thin disk gain media 120 is provided. An optical coupler 122 is positioned between each of the diode pump sources 112 and 114 and thin disk gain media 120. First and second pump beams 116 and 118 are incident on thin disk gain media 120 from different directions.

Figure 3:
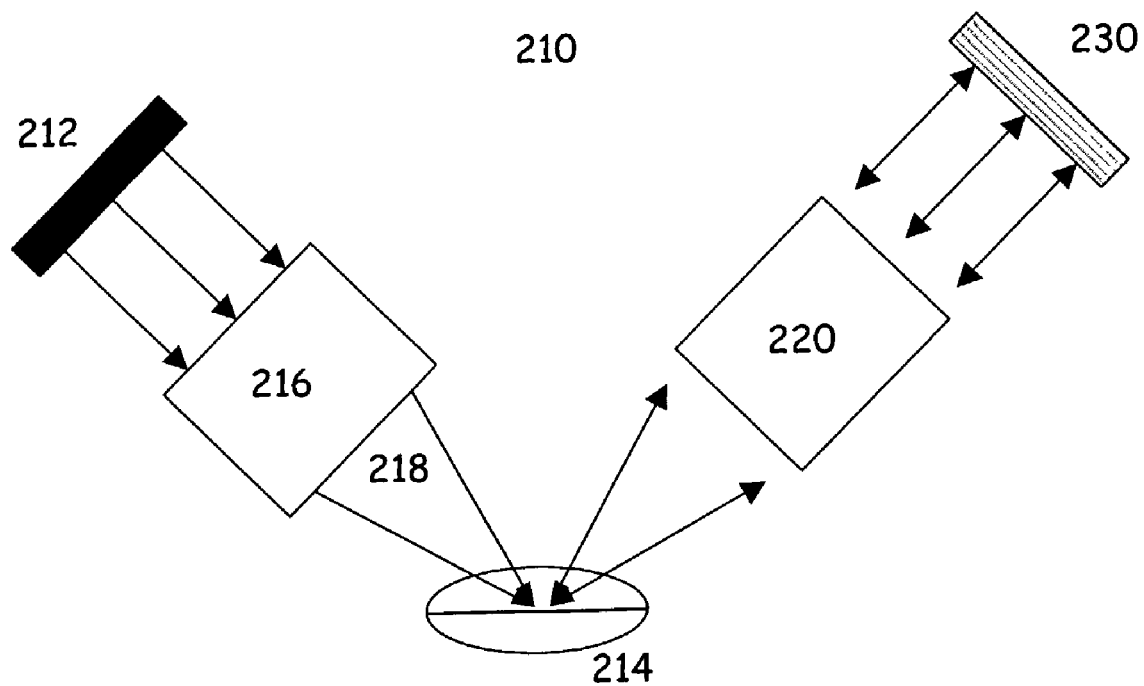
FIG. 3 is a schematic diagram of an embodiment of the present invention with a diode pump source, a coupler and a thin disk gain media where pump light passes through the thin disk gain media four times using a single mirror to redirect the pump light back to the thin disk gain media.

Referring now to FIG. 3, another embodiment of the present invention is an optical system 210 with a high power diode pump source 212 and a thin disk gain media 214. An optical coupler 216 is positioned between the diode pump source 212 and thin disk gain media 214. Optical coupler 216 produces a beam 218 that has a large numerical aperture incident on thin disk gain media 214. Beam 218 makes two passes through thin disk gain media 214 and the unabsorbed pump light is directed back to thin disk gain media 214 by optical coupler 220 and a single mirror 230. Beam 218 then makes a third and fourth pass through the gain media.

Coatings can be fabricated that are suitable for the large numerical aperture of the pump beam, according to the invention. Such coatings can be suitable for both the pump radiation from the diodes and the laser radiation emitted by the optical system.

Figure 4:
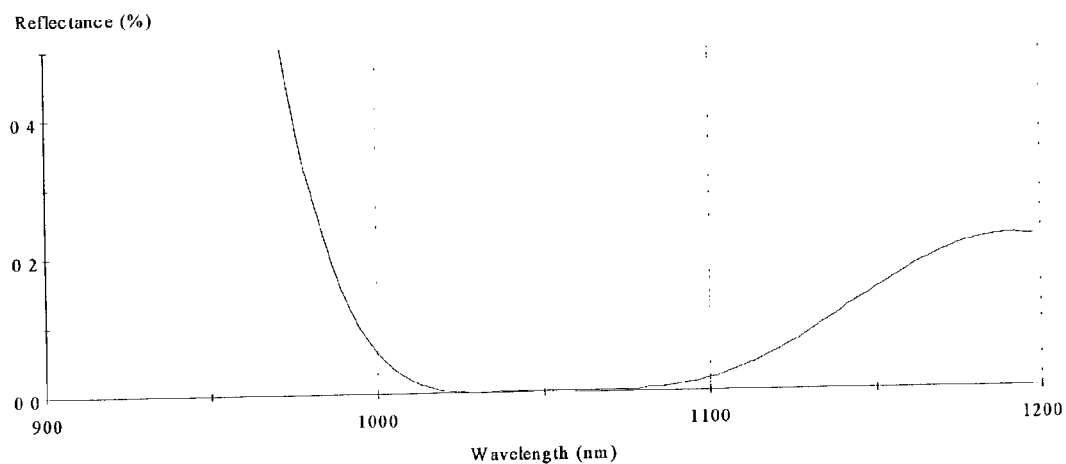
FIG. 4 displays the calculated reflectivity of an anti-reflection coating as a function of wavelength and angle.
Figure 4:
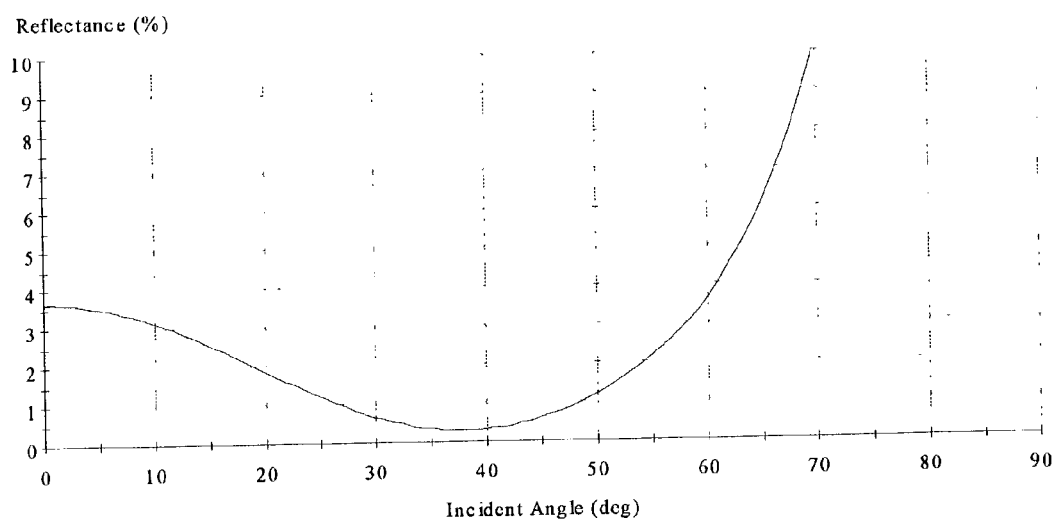

An anti-reflection coating on the incident surface of the gain media can consist of a single layer of magnesium fluoride. It can also consist of multiple dielectric layers. FIG. 4(a) shows the calculated reflectance of 7 alternating dielectric layers of SiO$_2$ and Ta$_2$O$_5$ designed to suppress reflection off the incident surface of a thin disk gain media with a refractive index of about 2, as a function of wavelength at normal incidence. Such a coating can be suitable for KYbW and other similar gain media. The reflectance stays well below 0.1% for a wavelength range from 1000 nm to above 1100 nm, which can allow for broad wavelength tunability of the optical system, and which also can support the broad wavelength spectra needed to form a femtosecond pulse.

FIG. 4(b) shows the reflectance of the same coating as a function of incidence angle with respect to the surface normal of the thin disk gain media for unpolarized light at a fixed pump wavelength of 940 nm. The reflectance stays below 4% over a range of incidence angles of up to 60 degrees with respect to the surface normal, and below 10% for angles up to 70 degrees. The reflectance curves for other pump wavelengths between 930 nm and 950 nm are very similar for this coating. A pump beam incident from cone angles between +70 and −70 degrees corresponds to a numerical aperture of sin((70°−(−70°))/2)=0.94. A pump beam incident from cone angles between +10 and +70 degrees corresponds to a numerical aperture of sin ((70°−10°)/2)=0.5.

It can also be beneficial to couple a thicker media to the top of thin disk gain media 14, 120 and 214. For example, a thin disk of highly doped Yb:YAG or YbAG can be diffusion bonded to undoped YAG that is transparent for the emission 18, 116, 118 and 218 of the pump diodes. In this case the anti-reflection coating can be deposited on the incident surface of the thicker media.

Figure 5:
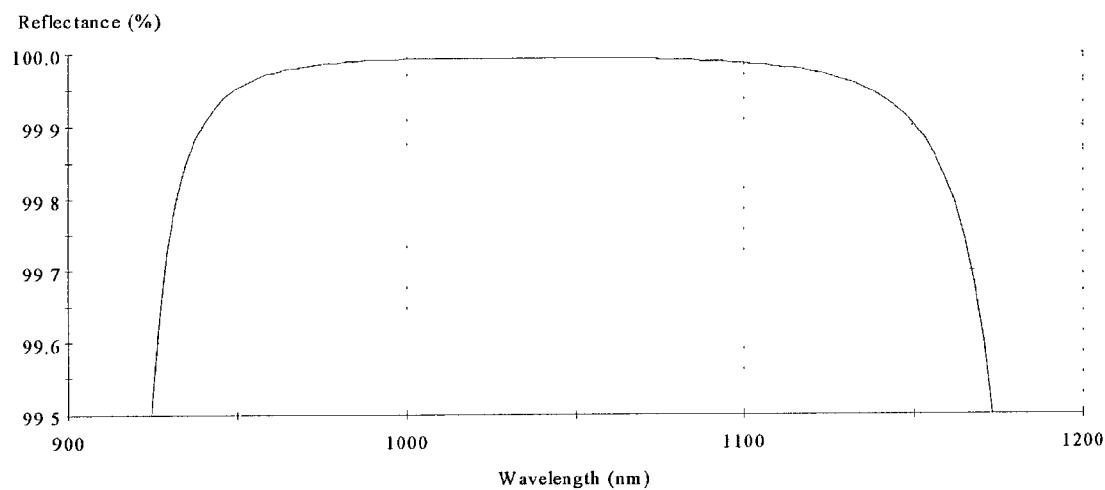
FIG. 5 displays the calculated reflectivity of a high-reflection coating as a function of wavelength and angle.
Figure 5:
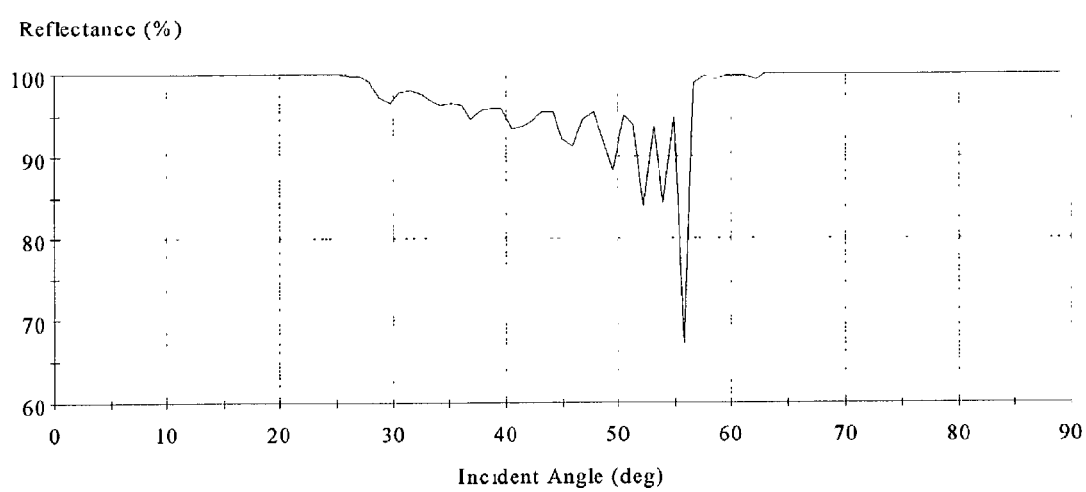

A high-reflectance coating on the reflecting surface of thin disk gain media 14, 120 and 214 can also consist of multiple dielectric layers. It can also include other materials such as metals like copper, silver, gold, and the like. In one embodiment, the high reflectance coating can be applied to the back side of thin disk gain media 14, 120 and 214, i.e. the surface opposing the incident surface. FIG. 5(a) shows the calculated reflectance of a suitable high-reflection coating for a gain material with a refractive index of about 2 as a function of wavelength at normal incidence. This design consists of 20 alternating dielectric layers of SiO$_2$ and Ta$_2$O$_5$ and a copper layer. Such a coating can again be suitable for KYbW and other similar gain media. The reflectance stays well above 99.98% for a wavelength range from below 1000 nm to about 1100 nm, which can allow for broad wavelength tunability of the optical system, and which also can support the broad wavelength spectra needed to form a femtosecond pulse.

FIG. 5(b) shows the reflectance of the same coating as a function of incidence angle measured outside thin disk gain media 14, 120 and 214 with respect to the surface normal of the thin disk gain media 14, 120 and 214 for unpolarized light at a fixed pump wavelength of 940 nm. The reflectance stays close to 100% over a range of incidence angles of up to 25 degrees with respect to the surface normal. For larger angles, up to 60 degrees, the reflectance drops but on average still stays above 90%. For angles larger than 60 degrees the reflection is again close to 100%. The reflectance curves for other pump wavelengths between 930 nm and 950 nm are also very similar for this coating.

When optical systems 10, 110 and 210 are configured as laser systems, the laser beams can be mode matched to the gain region in the thin disk gain media 14, 120 and 214. This allows the generation of a good output mode without sacrificing efficiency. Due to the one-dimensional cooling, the thermal gradient is also collinear to the laser beam and thus the thermal lensing is small.

When optical systems 10, 110 and 210 are configured as diode-pumped laser systems, they are useful for a variety of different applications. By way of illustration, and without limitation, a Yb doped gain media is useful for constructing mode-locked laser sources. Diode pumped lasers 10, 110 and 210 can produce subpicosecond pulse durations that can be obtained using semiconductor saturable absorbers as the mode-locking devices. High-power subpicosecond diode pumped laser systems 10, 110 and 210 can also be used to synchronously pump an OPO and produce a tunable source of subpicosecond pulses. A temperature tuned LBO crystal can be used as the parametric gain media for the OPO. Additionally, diode pumped lasers 10, 110 and 210 can be utilized in polarization coupled mode-locking systems.

Optical systems 10, 110 and 210 can be utilized as amplifiers. They can be configured as the gain element in either a multi-pass amplifier or alternatively, a regenerative amplifier. A regenerative amplifier system for amplifying pulses from a mode-locked oscillator is capable of generating subpicosecond pulses with energies of 1 mJ. Such amplifier systems can be based on chirped pulse amplification and use grating pairs for stretching the pulse prior to amplification and compressing the pulse after amplification. By way of example, and without limitation, diode-pumped systems 10, 110 and 210 can be sources of high peak power, subpicosecond pulses that are suitable for micromachining applications where high precision machining or reduction of thermal damage are important.

Further, diode-pumped systems 10, 110 and 210 can be intra-cavity frequency doubled lasers with a good spatial mode. Non-critically phase matched LBO can be used as the frequency doubling crystal to produce a high power source of green light with as much as 20 to 50 W of power for many applications including pumping other lasers. A single frequency source of either infrared, or green light, can be achieved because of spatial hole burning in thin disk gain media 14, 120 and 214, and finds applications in pumping both other lasers and single frequency OPOs, as well as spectroscopy and metrology.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. An optical system, comprising:
   a high power diode pump source producing a pump beam;
   an end-pumped thin disk gain media; and
   an optical coupler positioned between the diode pump source and the thin disk gain media, the optical coupler producing a modified pump beam with a large numerical aperture incident on the incident surface of the thin disk gain media, wherein the numerical aperture of the modified pump beam incident on the incident surface of the thin disk gain media is greater than 0.35.

2. The system of claim 1, wherein the pump source has a power of at least 50 W.

3. The system of claim 1, wherein the pump source has a power of at least 200 W.

4. The system of claim 1, wherein the numerical aperture of the modified pump beam incident on the incident surface of the thin disk gain media is greater than 0.4.

5. The system of claim 1, wherein the numerical aperture of the modified pump beam incident on the incident surface of the thin disk gain media is greater than 0.5.

6. The system of claim 1, wherein the optical coupler is selected from one or more of a funnel, a cylindrical lens to collimate a fast axis divergence of the pump source, several cylindrical lenses, a beam shaper, a lens duct, and a beam combiner.

7. The system of claim 1, further comprising: a cooling device coupled to the cooling surface of the thin disk gain media.

8. The system of claim 1, wherein the thin disk gain media is made of a stoichiometric gain material.

9. The system of claim 1, wherein the thin disk gain media is made of a stoichiometric $Yb^{3+}$ material.

10. The system of claim 9, wherein the stoichiometric $Yb^{3+}$ material is YbAG.

11. The system of claim 9, wherein the stoichiometric $Yb^{3+}$ material is KYbW.

12. The system d claim 1, wherein the thin disk gain media is made of a semiconductor material.

13. The system if claim 1, wherein the diode pump source is a stack of diode bars.

14. The system of claim 1, wherein the optical coupler is a non-imaging concentrator.

15. The system of claim 14, wherein the non-imaging concentrator is a lens duct.

16. The system of claim 1, wherein the optical coupler is a beam homogenizer.

17. The system of claim 14, wherein the non-imaging concentrator is configured to convert a large pump beam with a low numerical aperture from the diode pump source into a smaller pump beam with a larger numerical aperture.

18. The system of claim 14, wherein the non-imaging concentrator reduces a pump beam size from the diode pump source by a factor of at least two and the numerical aperture of the pump beam from the diode pump source increases by at least two.

19. The system of claim 14, wherein the non-imaging concentrator is a hollow funnel.

20. An optical system, comprising:
    at least first and second high power diode pump sources producing first and second pump beams;
    an end-pumped thin disk gain media;
    at least first and second optical couplers positioned between each of the diode pump sources and the thin disk gain media, the optical couplers producing modified pump beams with large numerical apertures; and wherein the first and second modified pump beams are incident from substantially different directions at substantially the same location on the incident surface of the thin disk gain media, wherein the numerical aperture of the modified pump beam incident on the incident surface of the thin disk gain media is greater than 0.35.

21. The system claim 20, wherein the pump sources produce a power of at least 50 W.

22. The system of claim 20, wherein the pump sources produce a power of at least 200 W.

23. The system of claim 20, wherein the numerical aperture of each of the first and second modified pump beams incident on the incident surface of the thin disk gain media is greater than 0.4.

24. The system of claim 20, wherein the numerical aperture of each of the first and second modified pump beams incident on the incident surface of the thin disk gain media is greater than 0.5.

25. The system of claim 20, wherein the optical coupler is selected from one or more of a funnel, a cylindrical lens to collimate a fast axis divergence of the pump source, several cylindrical lenses, a beam shaper, a lens duct, and a beam combiner.

26. The system of claim 20, further comprising: a cooling device coupled to the cooling surface of the thin disk gain media.

27. The system of claim 20, wherein the thin disk gain media is made of a stoichiometric gain material.

28. The system of claim 20, wherein the thin disk gain media is made of a stoichiometric $Yb^{3+}$ material.

29. The system of claim 28, wherein the stoichiometric $Yb^{3+}$ material is YbAG.

30. The system of claim 28, wherein the stoichiometric $Yb^{3+}$ material is KYbW.

31. system of claim 20, wherein the thin disk gain media is made of a semiconductor material.

32. The system of claim 20, wherein the diode pump source is a stack of diode bars.

33. The system of claim 20, wherein the optical coupler is a non-imaging concentrator.

34. The system of claim 33, wherein the non-imaging concentrator is a lens duct.

35. system of claim 20, wherein the optical coupler is a beam homogenizer.

36. The system of claim 33, wherein the non-imaging concentrator is configured to convert a large pump beam with a low numerical aperture from the diode pump source into a smaller pump beam with a larger numerical aperture.

37. The system of claim 33, wherein the non-imaging concentrator reduces a pump beam size from the diode pump source by a factor of at least two and the numerical aperture of the pump beam from the diode pump source increases by at least two.

38. The system of claim 33, wherein the non-imaging concentrator is a hollow funnel.

39. A method of pumping a thin disk gain media, comprising:
providing a high power diode pump source producing a pump beam;
passing the diode pump beam through an optical coupler positioned between the diode pump source and end pumping a thin disk gain media;
forming a modified pump beam with a large numerical aperture from the optical coupler, wherein the numerical aperture of the modified pump beam incident on the incident surface of the thin disk gain media is greater than 0.35; and
positioning the modified pump beam at an incidence surface of the thin disk gain media.

40. The method of claim 39, wherein the pump beam has a power of at least 50 W.

41. The method of claim 39, wherein the pump beam has a power of at least 200 W.

42. The method of claim 39, wherein the numerical aperture of the modified pump beam incident on the incident surface of the thin disk gain media is greater than 0.4.

43. The method of claim 39, wherein the numerical aperture of the modified pump beam incident on the incident surface of the thin disk gain media is greater than 0.5.

44. The method of claim 39, wherein the optical coupler is selected from one or more of a funnel, a cylindrical lens to collimate a fast axis divergence of the pump source, several cylindrical lenses, a beam shaper, a lens duct, and a beam combiner.

45. The method of claim 39, further comprising: cooling a cooling surface of the thin disk gain media.

46. The method of claim 39, wherein the thin disk gain media is made of a stoichiometric gain material.

47. The method of claim 39, wherein the thin disk gain media is made of a stoichiometric $Yb^{3+}$ material.

48. The method of claim 47, wherein the stoichiometric $Yb^{3+}$ material is YbAG.

49. The method of claim 47, wherein the stoichiometric $Yb^{3+}$ material is KYbW.

50. The system of claim 48, wherein the thin disk gain media is made of a semiconductor material.

51. The method of claim 39, wherein the diode pump source is a stack of diode bars.

52. A method of materials processing, comprising:
providing a high power diode pump sources producing a pump beam;
providing thin disk gain media;
passing the diode pump beam through an optical coupler positioned between the diode pump source and end pumping thin a disk gain media;
forming a modified pump beam with a large numerical aperture from the optical coupler, wherein the numerical aperture of the modified pump beam incident on the incident surface of the thin disk gain media is greater than 0.35;
positioning the modified pump beam at the incidence surface of the thin disk gain media;
amplifying the input beam to produce an output beam; and
directing the output beam to an article to be processed.

53. A method of pumping a thin disk gain media, comprising:
providing at least first and second high power diode pump sources producing first and second pump beams;
passing at least the first and second pump beams through at least a first and second optical coupler positioned between each diode pump source and end pumping a thin disk gain media;
forming at least a first and second modified pump beams with large numerical apertures from the optical couplers, wherein the numerical aperture of the modified pump beams incident on the incident surface of the thin disk gain media is greater than 0.35; and
positioning the first and second modified pump beams from substantially different directions at substantially the same location on the incident surface of the thin disk gain media.

* * * * *